(12) United States Patent
Mäkelä et al.

(10) Patent No.: US 7,590,627 B2
(45) Date of Patent: Sep. 15, 2009

(54) ARRANGEMENT FOR PROCESSING DATA FILES IN CONNECTION WITH A TERMINAL

(76) Inventors: Jakke Mäkelä, Vanha Hämeentie 110 A11, FIN-20540 Turku (FI); Marko Ahvenainen, Viserryskuja 10 B 6, FIN-36110 Ruutana (FI); Jukka-Pekka Vihmalo, Näreikönkatu 18 E 2, FIN-33820 Tampere (FI)

( * ) Notice: Subject to any disclaimer, the term of this patent is extended or adjusted under 35 U.S.C. 154(b) by 206 days.

(21) Appl. No.: 11/007,741

(22) Filed: Dec. 7, 2004

(65) Prior Publication Data

US 2006/0218197 A1 Sep. 28, 2006

(30) Foreign Application Priority Data

Dec. 12, 2003 (FI) .................................. 20035235

(51) Int. Cl.
*G06F 7/00* (2006.01)
(52) U.S. Cl. ........................ 707/5; 707/200; 455/418; 455/420
(58) Field of Classification Search ......... 707/200–206, 707/5; 455/418, 420
See application file for complete search history.

(56) References Cited

U.S. PATENT DOCUMENTS

| | | | | |
|---|---|---|---|---|
| 5,375,199 | A * | 12/1994 | Harrow et al. ............... | 715/771 |
| 5,548,740 | A * | 8/1996 | Kiyohara ..................... | 345/543 |
| 5,598,532 | A * | 1/1997 | Liron ............................ | 703/2 |
| 5,683,432 | A * | 11/1997 | Goedeke et al. ............... | 607/32 |
| 5,687,216 | A * | 11/1997 | Svensson .................. | 455/412.2 |
| 5,764,866 | A * | 6/1998 | Maniwa ...................... | 358/1.15 |
| 5,809,282 | A * | 9/1998 | Cooper et al. ................ | 709/226 |
| 5,930,243 | A * | 7/1999 | Parish et al. ................. | 370/334 |
| 6,026,375 | A * | 2/2000 | Hall et al. .................... | 705/26 |
| 6,119,011 | A * | 9/2000 | Borst et al. ................. | 455/452.2 |
| 6,154,745 | A * | 11/2000 | Kari et al. .................... | 707/100 |
| 6,182,079 | B1 * | 1/2001 | Lenzie ......................... | 707/101 |
| 6,311,187 | B1 * | 10/2001 | Jeyaraman .................... | 707/10 |
| 6,377,957 | B1 * | 4/2002 | Jeyaraman ................... | 707/200 |

(Continued)

OTHER PUBLICATIONS

"Minimization of Communication Cost Through caching in Mobile Environments"—Prasad Sistla, Ouri Wolfson and Yixiu Huang—1998—IEEE Transactions On Parallel and Distributed Systems—vol. 9, No. 4 Apr. 1998 (pp. 378-390).*

(Continued)

*Primary Examiner*—Jean B Fleurantin
*Assistant Examiner*—Anh Ly

(57) ABSTRACT

A terminal (1) is shown with a memory (3) for storing a file (F), means (2, 4) for selecting a file (F) to be deleted, and means (2, 4) for marking the file selected to be deleted as deleted. A system comprises at least one second device (8, 8.1, 8.2, 8.n) with a memory (7) with a storage location (13) for files marked as deleted, for storing files marked as deleted in the terminal (1). The terminal (1) is provided with a storage location (11) for storing at least a part of the data of the file (F) marked as deleted, and means (2, 5) for transmitting at least a part of the file marked as deleted, to be stored, if necessary, in the storage location (13) in the second device (8) for files marked as deleted. A method for managing files and a computer software product are also shown.

28 Claims, 9 Drawing Sheets

U.S. PATENT DOCUMENTS

| | | | |
|---|---|---|---|
| 6,519,410 B1* | 2/2003 | Okada et al. | 386/46 |
| 6,578,052 B1* | 6/2003 | Mansour et al. | 707/200 |
| 6,611,500 B1* | 8/2003 | Clarkson et al. | 370/252 |
| 6,650,781 B2* | 11/2003 | Nakaya | 382/236 |
| 6,823,350 B1* | 11/2004 | Mansour et al. | 707/206 |
| 6,950,646 B2* | 9/2005 | Pradhan et al. | 455/406 |
| 6,988,236 B2* | 1/2006 | Ptasinski et al. | 714/758 |
| 7,032,003 B1* | 4/2006 | Shi et al. | 707/10 |
| 7,072,672 B1* | 7/2006 | Vanska et al. | 455/456.3 |
| 7,130,622 B2* | 10/2006 | Vanska et al. | 455/419 |
| 7,440,559 B2* | 10/2008 | Muhonen et al. | 379/201.01 |
| 7,471,878 B2* | 12/2008 | Tagawa et al. | 386/96 |
| 2001/0014836 A1* | 8/2001 | Tamaki et al. | 700/99 |
| 2002/0016853 A1* | 2/2002 | Ressler | 707/10 |
| 2002/0052872 A1* | 5/2002 | Yada | 707/6 |
| 2002/0071419 A1* | 6/2002 | Paranchych et al. | 370/342 |
| 2002/0072355 A1* | 6/2002 | Jeong et al. | 455/419 |
| 2002/0107587 A1* | 8/2002 | Araki | 700/68 |
| 2002/0194474 A1* | 12/2002 | Natsuno et al. | 713/168 |
| 2003/0085932 A1* | 5/2003 | Samra | 345/853 |
| 2003/0120685 A1* | 6/2003 | Duncombe et al. | 707/200 |
| 2003/0162562 A1* | 8/2003 | Curtiss et al. | 455/556 |
| 2003/0166399 A1* | 9/2003 | Tokkonen et al. | 455/419 |
| 2003/0194989 A1* | 10/2003 | Guion | 455/406 |
| 2003/0217057 A1* | 11/2003 | Kuroiwa et al. | 707/7 |
| 2003/0220949 A1* | 11/2003 | Witt et al. | 707/204 |
| 2003/0236867 A1* | 12/2003 | Natsuno et al. | 709/220 |
| 2004/0006517 A1* | 1/2004 | Takatori | 705/26 |
| 2004/0098428 A1* | 5/2004 | Schulze et al. | 707/205 |
| 2004/0122873 A1* | 6/2004 | Wright et al. | 707/205 |
| 2004/0158829 A1* | 8/2004 | Beresin et al. | 717/173 |
| 2004/0242216 A1* | 12/2004 | Boutsikakis | 455/418 |
| 2004/0266442 A1* | 12/2004 | Flanagan et al. | 455/445 |
| 2005/0021661 A1* | 1/2005 | Duloutre et al. | 707/3 |
| 2005/0027757 A1* | 2/2005 | Kiessig et al. | 707/204 |
| 2005/0066305 A1* | 3/2005 | Lisanke | 717/104 |
| 2005/0083794 A1* | 4/2005 | Tagawa et al. | 369/30.08 |
| 2005/0108289 A1* | 5/2005 | East et al. | 707/200 |
| 2005/0120050 A1* | 6/2005 | Myka et al. | 707/104.1 |
| 2005/0192686 A1* | 9/2005 | Hirota et al. | 700/94 |
| 2005/0222918 A1* | 10/2005 | Vanska et al. | 705/26 |
| 2005/0228795 A1* | 10/2005 | Shuster | 707/10 |
| 2005/0231753 A1* | 10/2005 | Mertama et al. | 358/1.15 |
| 2005/0239494 A1* | 10/2005 | Klassen et al. | 455/550.1 |
| 2005/0278453 A1* | 12/2005 | Cherkasova | 709/231 |
| 2006/0149792 A1* | 7/2006 | Yamagami | 707/202 |

OTHER PUBLICATIONS

"A Flexible Multiple Mobile Robots System"—Kun-Chee Henry Fok & Mansur R. Kabuka—Robotics and Automation, IEEE transaction On—vol. 8, No. 5, Oct. 1992 (pp. 1-17 607-623).*

"The Accurancy of Proportional Cost Models: Evidence from Hopspital service Department"—Eric Noreen and Naomi Soderstrom—Revioew of Accounting Studies—vol. 2, No. 1, Mar. 1997 (pp. 89-114).*

Patent Abstracts of Japan, publication No. 2002-049510, publication date Feb. 15, 2002 and machine translation of Japanese document.

Patent Abstracts of Japan, publication No. 2003-085027, publication date Mar. 20, 2003 and machine translation of Japanese document.

Patent Abstracts of Japan, publication No. 08-328929, publication date Dec. 13, 1996 and machine translation of Japanese document.

* cited by examiner

ARRANGEMENT FOR PROCESSING DATA FILES IN CONNECTION WITH A TERMINAL

CROSS-REFERENCE TO RELATED APPLICATIONS

This application claims priority under 35 USC §119 to Finnish Patent Application No. 20035235 filed on Dec. 12, 2003.

FIELD OF THE INVENTION

The present invention relates to a system comprising a terminal with a memory for storing a data file, means for selecting a data file to be deleted, and means for marking the data file selected to be deleted, as having been deleted, and at least one second device with a memory. The invention also relates to a terminal comprising a memory for storing a data file, means for selecting a data file to be deleted, and means for marking a data file selected to be deleted as having been deleted. Furthermore, the invention relates to a method for processing data files in connection with a terminal, wherein data files are stored in a memory, a data file is selected to be deleted, and the data file selected to be deleted is marked as having been deleted. Finally, the invention relates to a computer software product with machine executable program instructions for processing data files in connection with a terminal, for storing data files in the memory of the terminal, for selecting a data file to be deleted, and for marking the data file selected to be deleted as having been deleted.

BACKGROUND OF THE INVENTION

In a data processor, information is typically stored in data files, wherein the data processors comprise an arrangement for processing such files. Information about each file is usually entered in a so-called directory, wherein the stored file can be retrieved later for processing. In many cases, such an entry in the file directory comprises e.g. the time of creating the file (date and time), the time of editing the file, the file name, the directory path, the file size, the file type, and possibly also information about whether the file has been edited e.g. after the latest backup copy was made.

In the data processor, the files are normally stored in a storage means in a disk drive unit, which storage means can be e.g. a fixed disk, a diskette, a memory card, or the like. Such storage means are normally divided into memory units of equal sizes, i.e. so-called sectors, wherein the file to be stored is divided into elements having the size of the memory units, and each element of the file is stored in one memory unit. Thus, the file directory or the file itself contains information about which memory units are used for the storage of said file and what is the correct order of the memory units. In one operating system, a so-called file allocation table (FAT) is used for storing information about the file to which each sector belongs and also the next/preceding memory unit. The file can thus be retrieved from the storage means by examining the information of the file allocation table. In practice, the data files can be physically stored on the storage means in a very fragmented way. However, each file constitutes a logical entity which is processed by the operating system of the data processor, for example, by means of said file allocation table, or the like. Thus, the applications can also process the file as a single logical entity.

In some systems, it is also possible to use so-called backup copying of files, wherein the same file is stored in two or more copies. In this case, the file can be restored either from an intact backup copy or by combining flawless parts from several copies. In view of the applications, however, it is a single file.

Files can be deleted from a storage means by selecting a file to be deleted from a directory and by entering a command to delete the file. What takes place when the file is deleted will depend, for example, on the operating system used in the data processor. In one operating system, a file is deleted by replacing the first letter in the file name in the directory with a given symbol, in which case the file is not displayed when the directory is browsed, and parts which have contained stored information of said file in the memory of the data processor are marked as being free. Thus, these parts of the memory, marked to be free, can be used for storing other files.

In another operating system, data files are deleted in such a way that the data is transferred into a so-called recycle bin, wherein the content of the data file is stored in a kind of wastebasket file. At this stage, the content of the data file to be deleted can also be compressed so that the data file transferred to the wastebasket will require less space. Thus, the file can be restored by retrieving it from the wastebasket. On the other hand, the file can be deleted finally by removing it from the wastebasket, after which, in practice, the file can no longer be recovered. It should be noted that the transfer of the file into the wastebasket does not necessarily mean that the physical data of the file were transferred to another location, but the transfer into the wastebasket can be made in a kind of logical way, for example, by marking the memory units allocated for the file to belong to the wastebasket. This can be done, for example, by changing the values of the file pointers in such a way that, with respect to the data processor, the file is processed as if it were stored in the wastebasket. These memory units are thus not completely released for rewriting, but they are still available.

The data deleting systems of prior art have some drawbacks, particularly if the possibility to recover a deleted file should be provided. If the file is deleted by removing its data from the file directory, the file can be recovered, in practice, as long as no new information has been stored in any of the sectors used for storing the file. When any other information has been stored in any one of such sectors, the original file cannot be recovered, at least not completely. In data processors with relatively little storage capacity, released sectors are normally used for other purposes relatively soon, wherein a deleted file can normally not be restored any longer. Accordingly, in operating systems applying said wastebasket, this wastebasket requires storage capacity, which limits considerably the use of the memory for other purposes, particularly in the case of portable data processors with a storage means of a relatively small size. On the other hand, when the wastebasket is used, there may be a need to reduce the size of the wastebasket to be so small that it will only take in a few deleted files at a time. Because such a wastebasket is filled up relatively quickly, the number of files in the wastebasket must be kept relatively small. Also in this case, it is often impossible to restore files in practice.

SUMMARY OF THE INVENTION

It is an aim of the present invention to provide an improved arrangement for storing and restoring deleted files. The invention is based on the idea that, if necessary, a file to be deleted from a terminal is transmitted to another device for storage. In practice, this means, for example, that the wastebasket of the terminal, of a part of it, is arranged in a second device, and a possibility is provided to set up a data transmission connection between the terminal and this second device, for transmitting information at least from the terminal to this second device. In the arrangement according to another embodiment of the invention, the data transmission connection is full duplex, wherein the files can also be easily restored by using the data transmission connection from this second device to the terminal. In the arrangement according to a third embodiment of the invention, the wastebasket is distributed among more devices than one, which may further increase the memory capacity available for the wastebasket. In an illustrative system said at least one second device is provided with a storage location for files marked as deleted, for storing data files marked as deleted; that the terminal is provided with a storage location for storing at least a part of the information of the file marked as deleted; and means for transmitting at least a part of the information marked as deleted, to be stored, if necessary, in the storage location for deleted files, formed in said at least one second device. The terminal is provided with a storage location for storing at least a part of the information of the file marked as deleted; and means for transmitting at least a part of the file marked as deleted, to be stored in at least one second device which is provided with a storage location for files marked as deleted. In an illustrative method at least a part of the information of the file marked as deleted is stored in the terminal, and, if necessary, at least a part of the file marked as deleted is transmitted to be stored in at least one second device. In an illustrative computer software product the computer software product comprises machine executable program instructions for storing at least a part of the information of the data file marked as deleted, in the terminal, and, if necessary, for transmitting at least a part of the file marked as deleted to be stored in at least one second device.

The present invention shows remarkable advantages over solutions of prior art. By the arrangement of the invention, the part of the deleted files allocated in the storage location, i.e. the wastebasket, or at least a significant part of them, can be released for other purposes, such as the storage of ordinary files, in a portable data processor. In the second device, the wastebasket can be provided with more space than in the portable data processor, wherein it is normally possible to store deleted files for a longer time in the wastebasket and thus to increase the probability that, if necessary, the deleted file can also be restored in the portable data processor. Furthermore, the invention can be applied in such a way that the wastebasket is formed in one or more such devices in the vicinity, wherein the arrangement of this function has the advantage that other devices in the vicinity can be temporarily used to increase the storage capacity allocated for deleted files in the portable data processor. The processing of the deleted files can also be optimized so that in a situation in which any file should be deleted permanently from the wastebasket, the deleting can be started, for example, from the oldest file on, i.e. the file deleted the longest time ago. Thus, for example, files which have been deleted unintentionally, are more likely to be recoverable in the portable data processor. On the other hand, files which were deleted a long time ago will no longer load the wastebasket in vain.

DESCRIPTION OF THE DRAWINGS

In the following, the present invention will be described in more detail with reference to the appended drawings, in which.

DETAILED DESCRIPTION OF THE INVENTION

Figure 4:
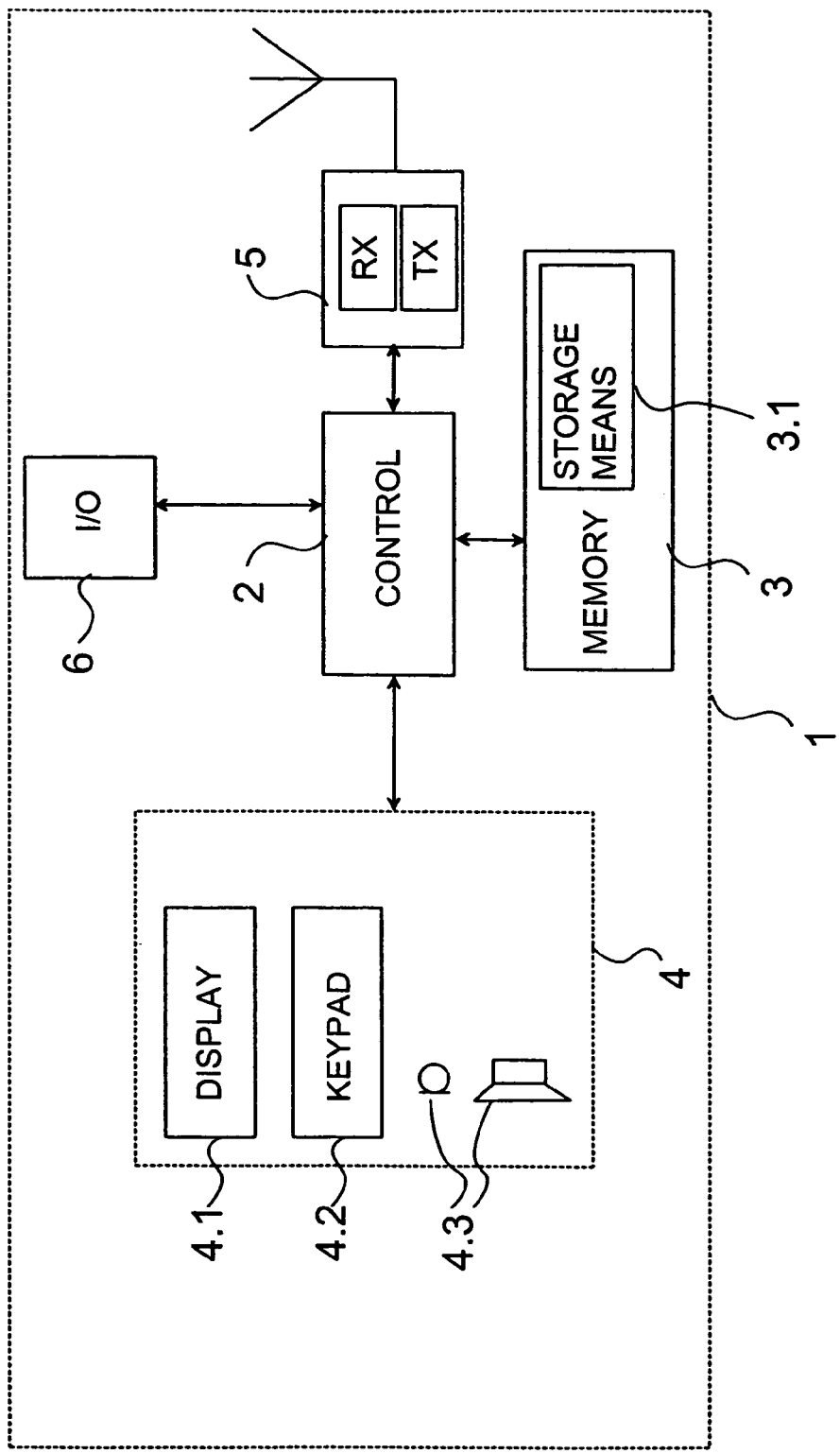
FIG. 4 shows a terminal according to an embodiment of the invention in a reduced block chart.
Figure 5:
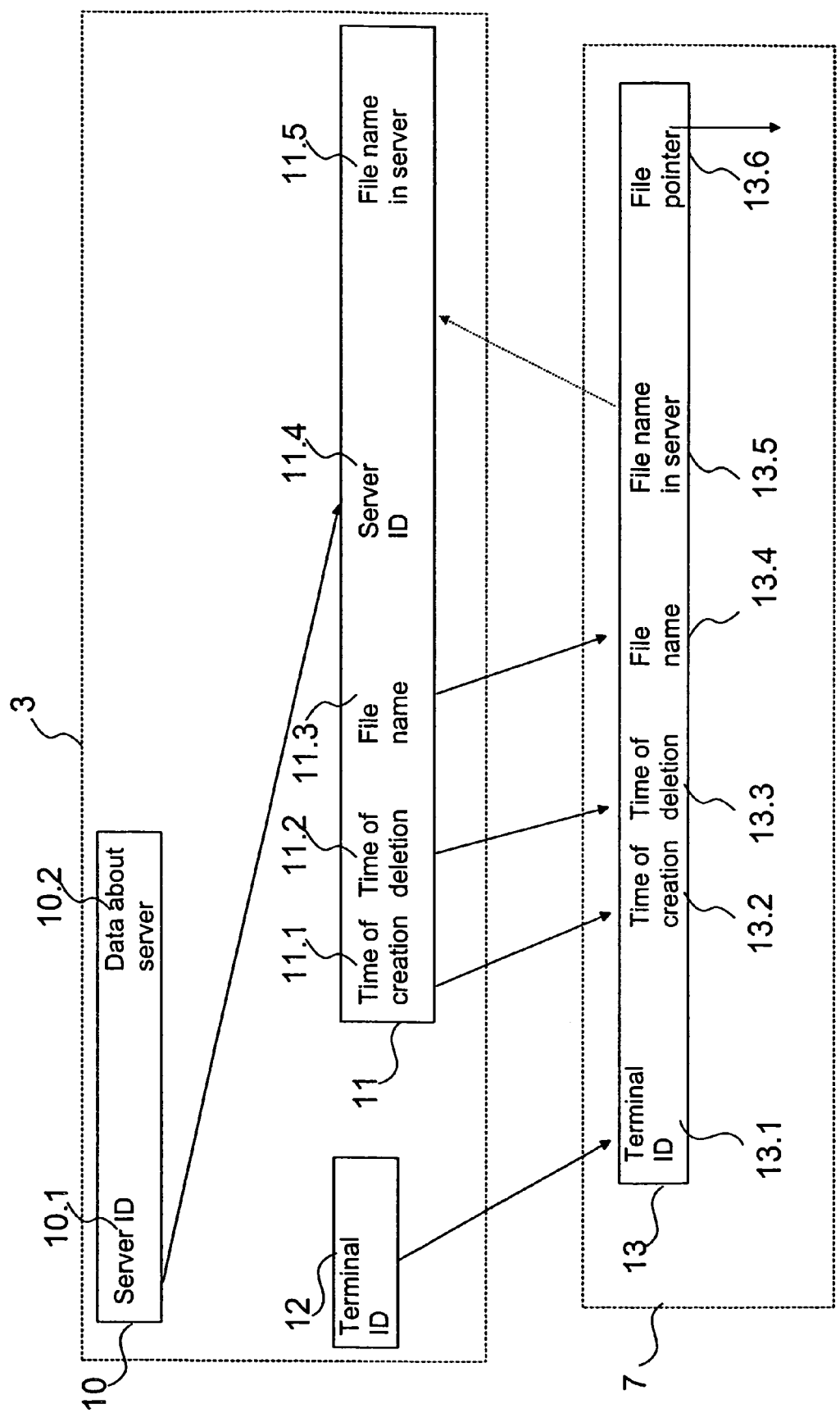
FIG. 5 illustrates the logical structure of the wastebasket arrangement according to one embodiment of the invention.

In the following, the invention will be described by using, as an example of a portable data processor, a mobile terminal 1 as shown in FIG. 4, but it will be obvious that the invention is not limited for use in such a device only. Other examples to be mentioned include a portable computer, a personal digital assistant (PDA), a laptop computer, a mobile communication device, such as Nokia 9210i Communicator, etc. The terminal 1 comprises a control block 2 for controlling the functions of the terminal 1. The terminal 1 also comprises a memory 3 which preferably comprises a read-only memory and a random access memory. Typically, the random access memory is used for the storage of data files. For the storage of the files, the random access memory comprises e.g. a storage means 3.1, such as a memory card, a fixed disk, or the like. Furthermore, the terminal 1 comprises a user interface 4 with, for example, a display 4.1, a keypad 4.2, and audio means 4.3. Moreover, the terminal 1 comprises at least one set of communication means 5 for data transmission between the terminal 1 and another device. The communication means can be, for example, for wireless data transmission, such as mobile communication means and/or short-distance communication means, and/or for cabled data transmission, such as a connection for a data transmission cable. Furthermore, the terminal 1 may comprise connecting means 6 for connecting, for example, a memory expansion card, a diskette, a CD-ROM, a digital versatile disk, or a corresponding storage means to the terminal 1.

In the description of the present invention, the term data file, or file, refers primarily to a logical file which can thus be stored as a single data cluster or distributed into several smaller units which are stored in different memory units in the storage means 3.1.

Figure 1:
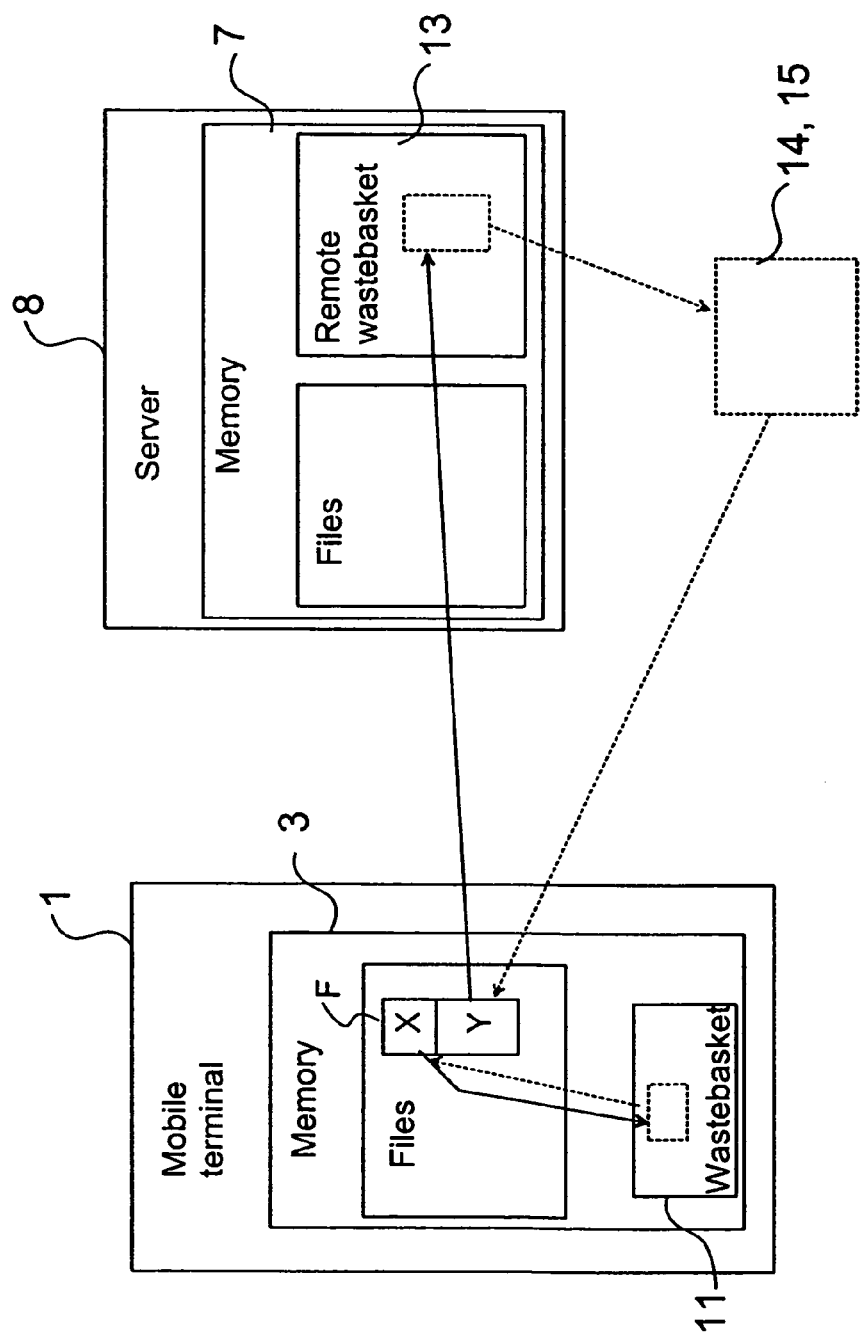
FIG. 1 shows a system according to an embodiment of the invention in a reduced chart.

We shall now describe the system according to a first embodiment of the invention with reference to FIG. 1. Let us assume that the terminal 1 is provided with a directory for processing files, the directory comprising information about the files stored in the terminal 1 as well as about the memory units allocated for them. The memory 3.1 used for the storage of the files comprises memory units into which the file can be stored in one or more parts. Consequently, the file is typically divided into parts with the size of a memory unit, wherein each part is stored in one such memory unit. Such a memory unit is also called a sector or an allocation unit. The user can use, for example, a file manager program, or the like, to process the files stored in the memory 3. Thus, the control unit 2 retrieves, from the directory, information related to the files stored in the memory 3, and transmits it to be displayed on the display 4.1. In practice, these functions are taken care of by the operating system and the applications under it. On the basis of the displayed information, the user can select a given file or given files and take some steps, such as open the file, transfer the file to another location, or delete the file. In this specification, the focus lies primarily on operations relating to the deleting of files and the restoring of deleted files.

At the stage when a file is deleted, information of the file is deleted from the directory and the memory units used by the file are marked to be free, wherein these memory units can be used for another purpose, such as for the storage of other files. The file to be deleted is logically transferred to a local storage location 11 for deleted files, i.e. a wastebasket, and in this embodiment of the present invention, this is performed for example in the following way. It is examined in the terminal 1 whether the memory 3 of the terminal has a sufficient space for storing this file in the wastebasket. If a sufficient space is not available, at least a part of the file to be deleted is transferred to a server 8. In this context, it should be mentioned that the server 8 can be any device with a possibility for storing files. Examples of such servers 8 to be mentioned include a data processor coupled to a local area network (a work station, a server), another portable data processor, a personal computer, or the like.

When the file to be deleted, or a part of it, has been selected to be transferred to the server 8, a notice of this can be given to the user of the terminal 1, wherein he/she can decide whether or not to start to transfer the file. If the user decides to transfer the file, the transmission of the file from the terminal 1 to the server 8 is started. On the other hand, the file can be transferred without asking for the user's permission for the transfer of the file. Thus, it can be defined, for example in the user settings, whether the transfer will be made automatically or whether the user will be requested to give permission for the file transfer before the transfer is started.

The transfer of the file to the server 8 can be implemented by a suitable data transmission arrangement. For example, it is possible to use the data link of a mobile communication network (GSM datalink), if it is available. The data transmission can also be made by using the GPRS packet network, if it is available. If the server 8 is close to the terminal 1, it is also possible to use a short-distance data transmission method, such as the Bluetooth™ system, the WLAN system, an optical short-distance data transmission system, cabled transmission, or another suitable data transmission system. The information of the file to be transferred is received in the server 8 and stored in a storage location 13 for deleted files, i.e. a kind of a data file (wastebasket), arranged in the memory 7 of the server 8. If necessary, the data can also be compressed at the stage of the file transmission and/or storage, wherein the file transmission is accelerated and the file normally fits in a smaller space. The compressing method used is lossless compressing, if it is desired that the compressed file can be restored to its original format.

Figure 2:
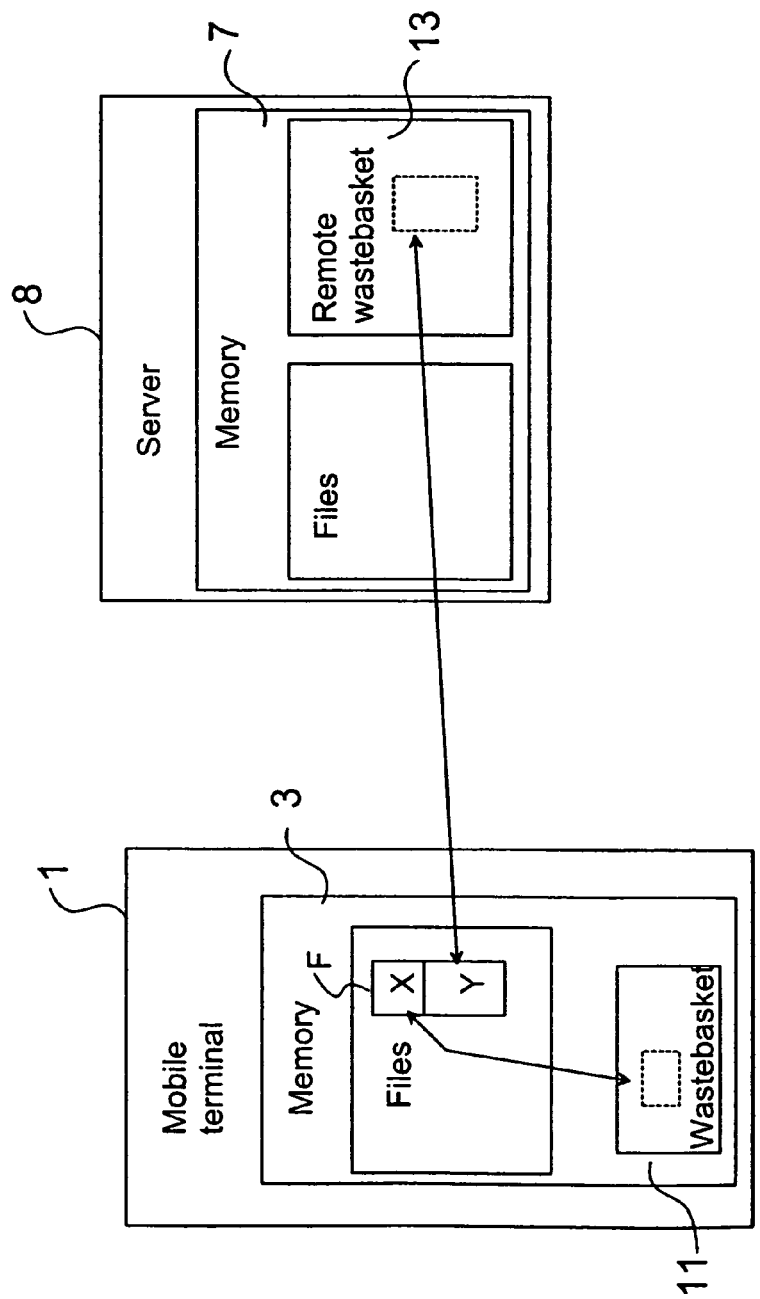
FIG. 2 shows a system according to another embodiment of the invention in a reduced chart.

In this embodiment, the file system of the terminal 1 cannot process the wastebasket 13 arranged in the server 8. Thus, if the deleted file is to be recovered from the wastebasket of the server 8 to the terminal 1, this must be performed, for example, by the server 8, via another computer 14 contacting the server 8, or by a particular program to be run in the terminal 1, whereby it is possible to contact the server 8, to browse the contents of the wastebasket therein, and to transfer the desired file to the terminal 1. For recovering the file, it is also possible to use another portable memory means 15, such as a diskette, a memory card, or the like. In FIG. 2, broken lines illustrate this restoring of a deleted file into the file system of the terminal 1.

In a system according to the second embodiment of the invention, which is illustrated in FIG. 2, duplex data transmission is applied between the terminal 1 and the server 8. In this case, the file system and the user interface of the terminal 1 construe the wastebasket in the server as a part of the file system of the terminal 1. It can be seen, for example, as a separate disk drive unit in the file system of the terminal 1. Thus, for example a file manager application can be used to examine the contents of this disk drive unit, or wastebasket, and to restore data from it to the terminal 1. Thus, a data transmission connection is formed between the terminal 1 and the server 8 when the wastebasket is browsed and files are recovered from the wastebasket to the terminal 1. Also in this embodiment, the data transmission connection can be arranged either by short-distance data transmission or by using a remote data transmission system, such as a mobile communication network and/or the Internet data network.

Figure 3:
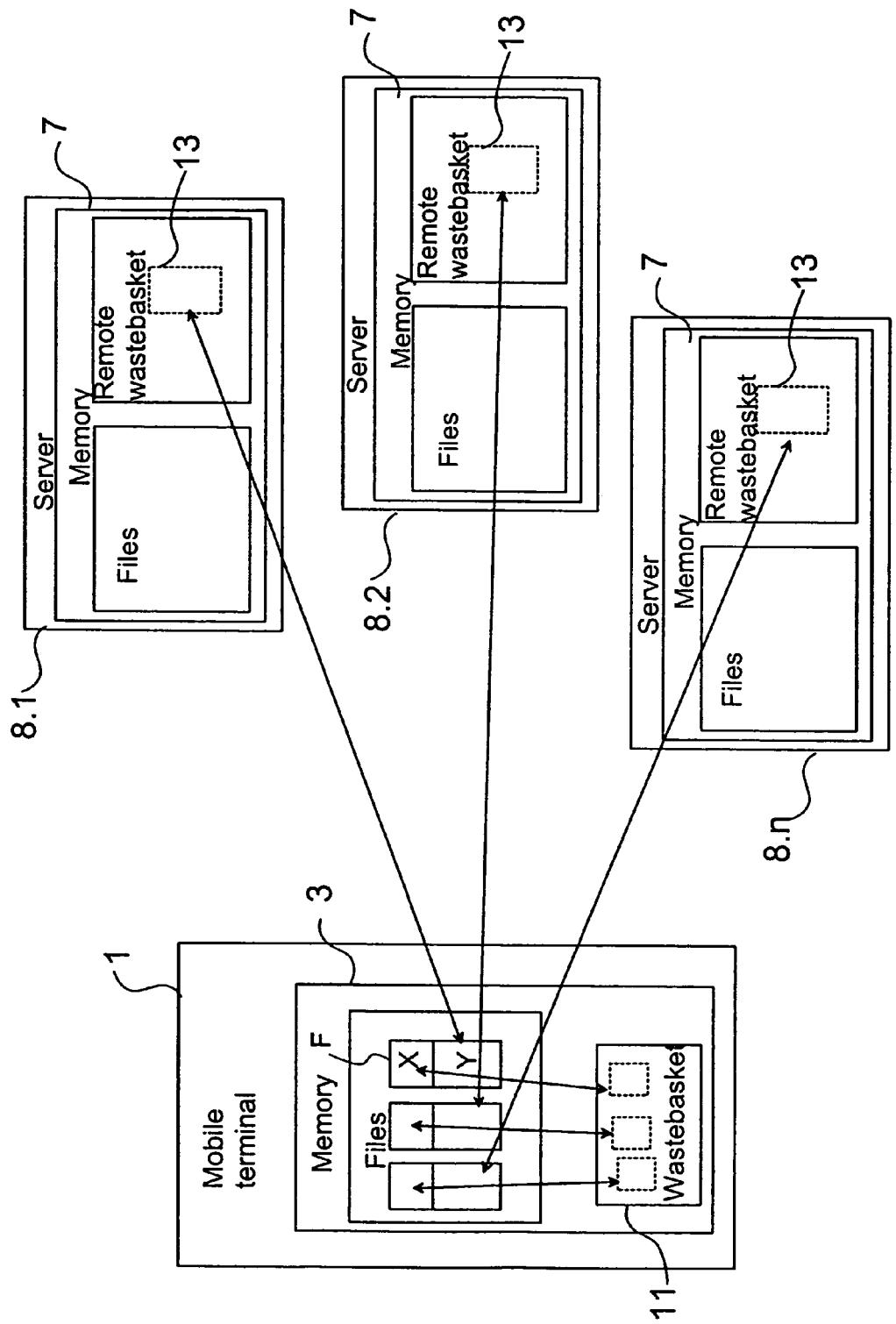
FIG. 3 shows a system according to a third embodiment of the invention in a reduced chart.

In the system according to the third embodiment of the invention, the wastebasket is distributed into two or more server devices 8.1, 8.2, 8.$n$. This is illustrated in FIG. 3. This arrangement can be unidirectional, like the first embodiment of the invention, or bi-directional, like the second embodiment of the invention. The arrangement according to this third embodiment can be implemented, for example, in an office environment with a local area network or a wireless local area network WLAN comprising several servers 8.1, 8.2, 8.$n$ or work stations which can be used as the server device 8 according to the present invention. In this embodiment, for example the terminal 1 is responsible for the management of the wastebasket and its distribution to the different servers 8.1-8.$n$. Thus, the terminal 1 can also determine, in which server 8.1-8.$n$ a specific deleted file is located at each time. However, this file is not necessarily found as a whole in one server 8.1-8.$n$, but it may also have been divided into a number of these servers. Also in this embodiment, the recovery of the deleted file can be performed, for example, by the file manager program of the terminal 1. In this case, the file manager program finds out, in which server or servers the data file is located. One possibility for implementing this distributed wastebasket is that each server 8.1-8.$n$ is seen as a separate disk driver unit in the terminal 1, wherein the contents of the wastebasket of each server 8.1-8.$n$ can be browsed by using the terminal 1.

Figure 9:
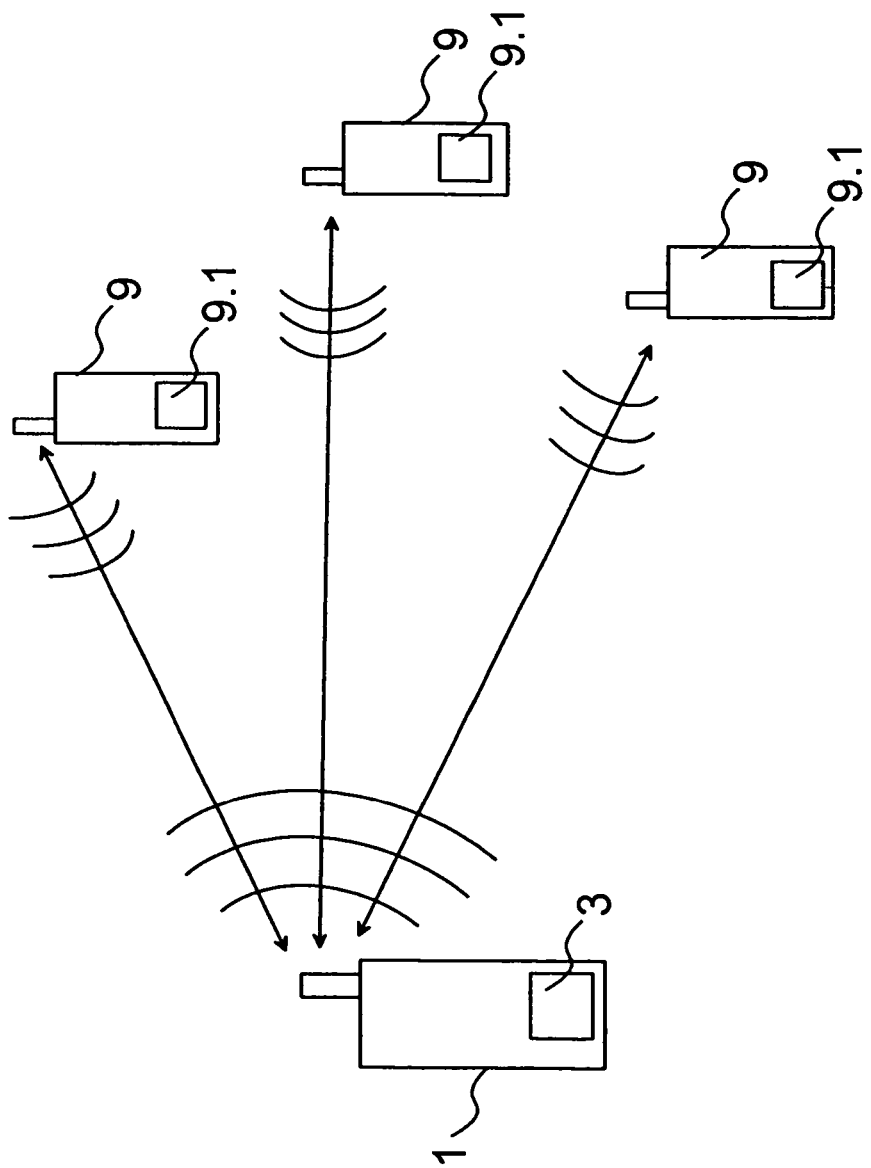
FIG. 9 shows a system according to one embodiment of the invention in a reduced chart.

The invention can also be applied in such a way that one or more nearby data processors 9 with storage means 9.1 for the storage of files are used as the location for storing deleted files. FIG. 9 shows this embodiment in a principle chart. The terminal 1 tries to find out if there is any other nearby data processor 9 which could be used as the storage location for deleted files. This can be determined, for example, by transmitting an inquiry message from the wireless short-distance communication means, to which inquiry another nearby data processor 9 transmits a reply message, if the data processor 9 has means for receiving the inquiry message. Another possibility is that the second data processor 9 transmits messages at intervals by the short-distance communication means, wherein the terminal 1 listens if such messages have been transmitted and when detecting a message, transmits a response to it.

After the terminal 1 has determined that there is at least one second nearby data processor 9 for the storage of deleted files, the necessary measures can be taken to use the second data processor 9 as the storage location for the deleted files. In this embodiment, it is also possible to ask the users of the terminal 1 and the second data processor if they allow the use of the second data processor 9 as the storage location for files deleted from the terminal 1. If the second data processor 9 is used as the storage location of deleted files, data compression and/or encryption can be used in the transfer and the storage of the deleted files. The encryption is used to prevent access to the content of the deleted files by parties other than the user of the terminal 1. The files are transferred, for example, by means of wireless short-distance communication means. The recovery of the files from the storage location for deleted files can also be performed by means of the short-distance communication means.

The above-described embodiment is suitable, for example, for situations in which a given place is entered and left by persons carrying a data processor which can be used in the system. Such places include, for example, offices, public places, such as bus stations, railway stations, airports, business enterprises, etc. The terminal 1 and the data processors 9 thus constitute a kind of an ad hoc network, in which data can be transmitted. When a data processor 9 or a terminal 1 exits the area, the storage location of the files deleted from the terminal 1 is deleted from the data processors 9. At this stage, if necessary, an attempt may be made to transfer the deleted files back to the terminal 1, if it is possible, or the deleted files are deleted permanently from the storage location.

We shall now discuss the logical structure of the arrangement for storing deleted files according to one embodiment of the invention. The arrangement comprises various tables 10, 11, 13 for the storage of certain information. The system comprises, for example, a server table 10 with information about the server 8. When more than one servers 8.1-8.$n$ are used, this server table 10 comprises information about all these servers 8.1-8.$n$ which are used for implementing the storage location of deleted files. The server table 10 comprises a server ID 10.1 as well as other information 10.2 about the server 8. The server table 10 is stored in the memory 3 of the terminal 1. The memory 3 of the terminal 1 also comprises stored information about a local storage location for deleted files, i.e. a local wastebasket 11, comprising data about files deleted from the terminal 1. This information includes, for example, the time 11.1 of creating the file, the time 11.2 of deleting the file, the file name 11.3, the server ID 11.4, as well as the name 11.5 of the deleted file in the server 8.1-8.$n$. Also a terminal ID 12 is stored in the terminal 1. This terminal ID 12 can be, for example, the International Mobile Equipment Identity IMEI or another code which defines the data processor in an unambiguous way, at least within a given geographical region.

If the invention according to the above-described embodiment is used in a limited geographical area, the code of the data processor should be individual within said geographical area, but the same code can also be used in data processors in different geographical areas.

The server 8 comprises a storage location for deleted files, i.e. a remote wastebasket 13, for the storage of files deleted from the terminal 1. This remote wastebasket 13 comprises, for example, information about the terminal ID 12 stored in the identifier field 13.1. Thus, the server 8 may simultaneously comprise several different remote wastebaskets 13 relating to different terminals. Preferably, the remote wastebasket 13 of the server also comprises information about the time 13.2 of creation and the time 13.3 of deletion of the deleted file, the name 13.4 used for the file in the terminal 1, information about the file name in the server 13.5, as well as one or more file pointers 13.6 to the storage location of the deleted file. Furthermore, the server 8 may comprise a file allocation table, or the like, indicating which memory units are allocated for each deleted file. Thus, the file pointer 13.6 in the table 13 points, for example, to the location where the allocation data of the file begin in this file allocation table.

Although the invention has been described above in such a way that for transferring a file to the wastebasket, the physical data of the file are transferred, it is obvious that this is not necessary in all situations. For example, it is possible to transfer only some file pointers, or the like, which indicate that the memory units used by the file are now allocated for the wastebasket; in other words, the file has been logically transferred to the wastebasket. Thus, the file is marked as having been deleted, although the other physical data of the file were left intact.

The physical transfer of the file into the wastebasket is not necessarily started at once in connection with the logical deletion of the file, but the physical transfer may be timed to take place, for example, at night or at another suitable time. The data transfer can be timed to take place at a time which is more advantageous, for example, in view of the data transmission costs, or in a situation in which the data transmission connection of the terminal 1 (e.g. GPRS data connection) is active in any case. The physical transfer of the file can also be timed to take place according to the degree of filling of the storage means 3.1 of the terminal 1. Thus, the physical data of the files are maintained in the storage means 3.1 of the terminal 1 as long as possible without risking the storage of other data. In this alternative, the physical transfer of the data is carried out, for example, when the relationship between the free memory space in the storage means 3.1 and the storage capacity of the storage means 3.1 goes below a given value.

Figure 6:
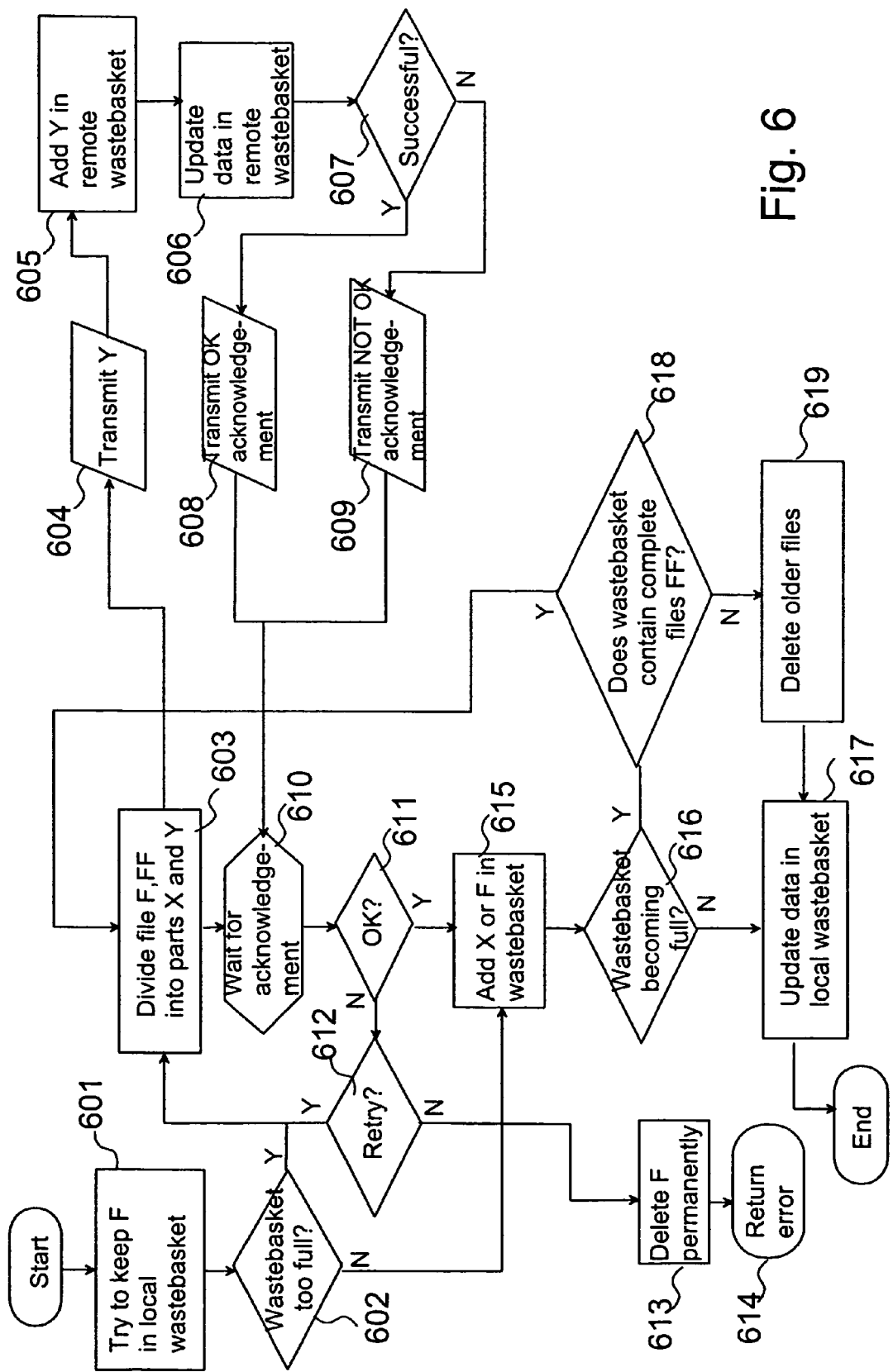
FIG. 6 shows, in a reduced block chart, the method according to an embodiment of the invention in connection with the deleting of files.
Figure 7:
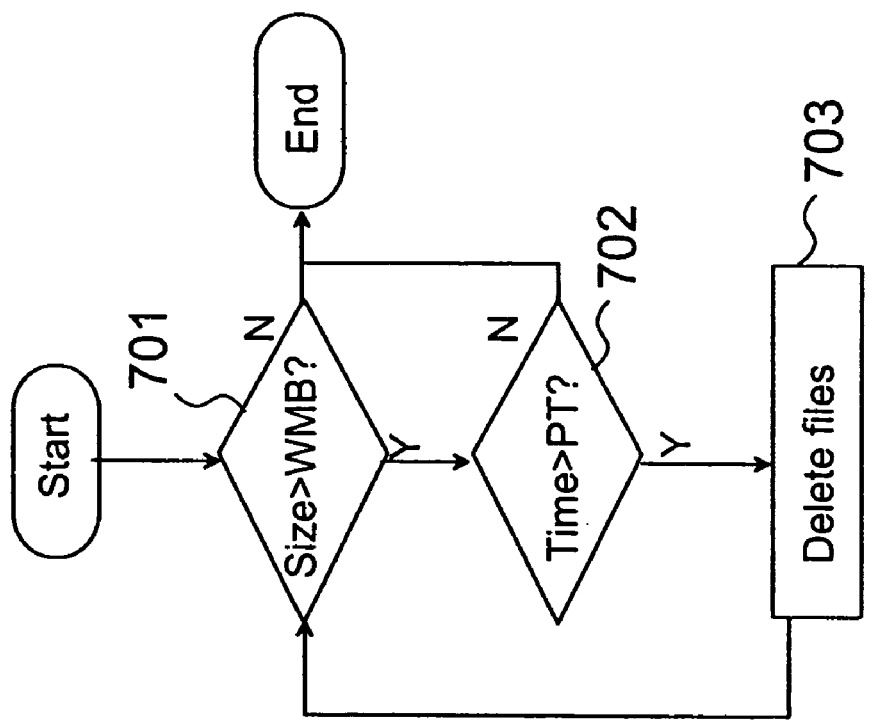
FIG. 7 illustrates the deleting of files from the wastebasket.
Figure 8:
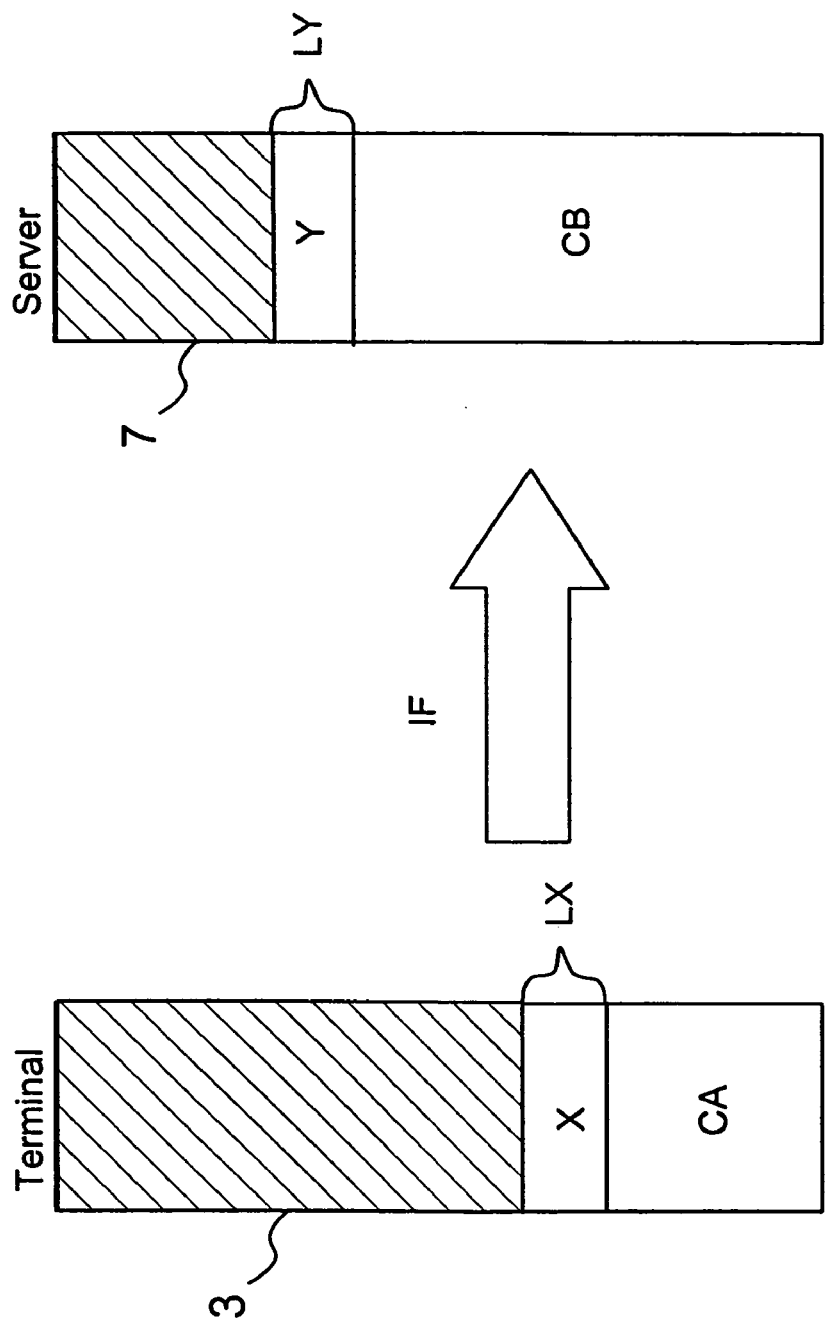
FIG. 8 illustrates the division of deleted files into separate parts in connection with one embodiment of the invention.

We shall now discuss the operation of the method according to one embodiment of the invention with reference to the flow charts of FIGS. 6 and 7 as well as FIG. 8. In the terminal 1, a file F to be deleted is maintained 601 in the local storage means 3.1 of the terminal 1. It is examined 602 in the terminal 1, whether the storage means 3.1 of the terminal 1 comprise a sufficient space for the physical storage of the file to be deleted. If sufficient space is available, the file F to be deleted is transferred in block 615 to a logical wastebasket. However, if sufficient space is not available, the file F selected to be deleted is divided, for example, into two parts. These parts are indicated with the references X and Y. The part X is intended to be stored in the terminal 1, and the part Y is intended to be stored in a remote wastebasket 13, i.e. a server 8, 8.1-8.$n$. This division is illustrated with block 603 in the flow chart of FIG. 6. The part Y is transmitted 604 to the server 8, in which the part Y is added 605 in the remote wastebasket 13. It is assumed here that a sufficient space is available for storing this part Y in the server 8. In the server 8, data of the remote wastebasket 13 is updated 606. The next step 607 is to examine, whether the data storage was successful. If it was, data about the successful storage is transmitted 608 to the terminal 1. If an error occurred during the storage of the part Y or during the updating of the data in the remote wastebasket, a notification of this is transmitted 609 to the terminal 1. The terminal 1 will wait 610 for an acknowledgement from the server 8. After the acknowledgement has been received, the content of the acknowledgement is examined 611. If the acknowledgement indicates an error during the storage, it is examined in block 612, whether the storage should be retried. If it should, the next step is to move to block 601. If it was determined in block 612 that storage will not be retried, an attempt is made to maintain 613 the whole file in the local wastebasket 11 of the terminal 1. Next, it is examined in block 614, if the local wastebasket 11 is too full for storing the file. If it is found that the file cannot be stored in the local wastebasket 11, the file F is deleted permanently (block 613), and the user is notified of the error 614 e.g. via the user interface 4 of the terminal. If it was determined in block 611 that a notification of the successful storage of the part Y in the remote wastebasket 13 (OK data) was returned from block 8, the part X of the deleted file is added into the local wastebasket 11 in block 615. Next, it is examined in block 616, whether the local wastebasket 11 is about to become full. If the local wastebasket 11 is not yet close to becoming full, data of the local wastebasket 11 is updated in block 617. However, if it is detected in block 616 that the local wastebasket 11 is about to be relatively full, it is examined, for example, if the wastebasket 11 of the terminal 1 comprises complete files FF which could be transferred to the remote wastebasket 13. If one or more such files FF are found, an attempt is made to transfer one or more such files FF to the remote wastebasket 13. Thus, the operation continues e.g. from block 603 by dividing the file FF, if necessary, to parts X and Y, and taking steps which are, in other respects, primarily similar to the steps 604 to 616 described above, to transfer the file FF or a part of it to the remote wastebasket 13. However, if no complete files FF are found in the local wastebasket 11, one or some (e.g. older) files are deleted 618 from the local wastebasket 11, after which the data in the local wastebasket 11 is updated 617. This deleting of the files may be based on various criteria, which may include, for example, the time of creating the file, the time of deleting the file, the file size, the author of the file, etc.

It will be obvious that the above-presented method is only one option, but in practical applications, also methods different from the above-presented method can be implemented.

In yet another embodiment of the invention, the following steps are taken after examining the degree of filling of the wastebasket in block 602. Instead of dividing the file F into parts and/or transferring it into the remote wastebasket 13, it is first examined, if the local wastebasket 11 contains such complete older files FF which could be, if necessary, divided into parts X, Y, and if e.g. part Y (or the whole file FF) could be transferred to the remote wastebasket 13. If one or more such files are found, an attempt can be made to transfer one or more such files FF to the remote wastebasket 13. However, if no complete files which could be transferred to the remote wastebasket 13 are found, the file F to be deleted is divided, if necessary, to parts X, Y, and the part Y (or, if necessary, the whole file F to be deleted) is transferred to the remote wastebasket 13 e.g. in the way described above with reference to FIG. 6.

The flow chart of FIG. 7 shows the steps of emptying the remote wastebasket 13 in one embodiment of the present invention. It is examined in block 717, if the size of the remote wastebasket 13 is larger than the size allocated for the remote wastebasket 13 in the server 8. If this is so, it is examined in block 702, if a given time BT has been passed since the time of deleting a file. If such a file is found, it is deleted (or, if appropriate, several such files) in block 703, and the operation continues in block 701. In other cases, i.e., if it was found in block 701 that the size of the wastebasket has not yet reached the maximum, or if none of the files in the wastebasket has not yet been deleted for said given time, the file is not deleted.

We shall now describe a so-called cost function to be used in the method according to one embodiment of the invention. In the definition of the cost function, the terminal 1 is also referred to with the letter A, and the server 8 is also referred to with the letter B. It is assumed that the file to be deleted is originally in the terminal 1 and that the length of the file is LF. The terminal 1 comprises free memory capacity CA for storing the file. The terminal 1 is arranged in a data transmission connection with the server 8 by means of a connection IF. The free memory capacity for the remote wastebasket 13 in the server 8 is indicated with the abbreviation CB.

The cost function can be defined in a variety of ways depending, e.g., on the starting points and aims of each application in question, wherein the non-restrictive example to be presented below is only one possible way of implementation. It is assumed here that the file F is divided into a first part X with a length LX and a second part Y with a length LY. Of these parts, the first part X will be left in the terminal 1 and the second part Y will be transferred to the remote wastebasket 13. In the cases complying with the first and second embodiments of the invention, either the first part X or the second part Y has the length 0, i.e., either X=0 or Y=0. Thus, the division does not actually need to be made, but either the first part X is stored in the local wastebasket 11 (Y=0) or the second part is stored in the remote wastebasket 13 (X=0). In the case according to the third embodiment, both the length LX of the first part X and the length LY of the second part Y can be different from zero.

Generally, the following can be stated: In view of the terminal 1, the cost function CFA(LX) for the file F depends on the relationship between the length LF of the file F and the storage capacity CA of the terminal 1. If the length LX of the first part X is considerably smaller than the free memory capacity CA in the terminal 1, and if the free memory capacity CA in the terminal 1 is relatively large, it means that the storage of the first part X in the terminal 1 can be considered cost-effective, because it does not significantly use the storage resources of the terminal 1. However, if the length LX of the first part X is close to the free memory capacity CA of the terminal 1, and/or the free memory capacity CA of the terminal 1 is very small, then the storage of the first part X in the terminal 1 will require a relatively large quantity of the memory capacity CA. Consequently, it is probable that, in practice, the space allocated for the storage of the first part X should be available for the storage of another, non-deleted file, e.g. when editing a file or creating a new file. If the second part Y is transferred to the remote wastebasket 13 provided in the server 8, this may cause e.g. data transmission costs CIF (Y) to the user of the terminal 1, and costs may also be caused by the storage in the server 8.

These costs to be presented in connection with the cost function must not be interpreted as financial costs only, but e.g. the resource allocation can also be regarded as a cost, because it requires a part of the memory capacity.

Data storage in the remote wastebasket 13 can be indicated with the cost function CFB(Y). We now have three cost functions CFA(X), CFI(Y) and CFB(Y) to consider. Thus, the first cost function CFA(X) is the cost function causing the storage of the first part X in the terminal 1, and factors related to it include the length LX of the first part X and the free memory capacity CA in the terminal 1. The second cost function CFI(Y) is the cost function related to the data transmission, and factors involved include the length LY of the second part Y, the data transmission costs, the bandwidth and/or data transmission rate available for the data transmission, etc. The third cost function CFB(Y) consists of the storage of the second part Y in the remote wastebasket 13 of the server 8, wherein the factors of the cost function are the length LY of the second part Y as well as the free memory capacity CB available for the remote wastebasket 13 in the server 8. Thus, the total cost function CFT(X,Y) is the weighted sum of the three above-mentioned cost functions. An optimum solution is obtained by setting the parts X and Y, i.e. the length LX of the first part X and the length LY of the second part Y, in such a way that the total cost function LFT(X,Y) is minimized.

In one example case, the cost functions are determined as follows. The first cost function CFA(X) is determined as the product KA×LX×CA/(CA−LX). The second cost function CFI(Y) is determined on the basis of the product KI×LY. Accordingly, the third cost function CFB(Y) is determined as the product KB×LY×CB/(CB−LY). In the above-mentioned functions, the terms KA, KI and KB are weight coefficients whose selection is affected e.g. by the memory capacity in the application available in each case, as well as the data transmission costs.

To simplify the computation, we can for example assume that the memory capacity CB of the server 8 is, in practice, indefinite, wherein the total cost function CFT(X,Y) is reduced to the form CFA(X)+CFI(Y). In another case accordingly, it is assumed that the file is not divided, wherein the file is either stored in the terminal 1 or transferred as a whole to the remote wastebasket 13 in the server 8. In this case, the possible values of the total cost function are only CFA(F) or CFI(F), wherein the cost function with the smallest value is selected. For example, if CFA(F) receives the smallest value, the whole file F is maintained in the terminal 1; otherwise, the whole file F is transferred to the remote wastebasket 13 in the server 8.

In yet another reduced situation, it is assumed that the length of the first part X is only a few first bytes in the file F, and the second part Y consists of the rest of the file F. Thus, the length LY of the second part Y is typically significantly greater than the length LX of the first part X. However, it is also possible to divide the file F into the first part X and one or more second parts Y in another way, depending on the application.

The terminal 1 also comprises the necessary pointers to determine the storage location of the deleted files. The pointers can point at e.g. all the files in the local wastebasket 11 and/or the remote wastebasket 13, or a file system to be used for managing the remote wastebasket 13 in the server 8.

The different functions of the present invention can be largely implemented by programming, for example, in the software of the control block 2 of the terminal 1 and, if necessary, also in the software of the server 8.

It will be obvious that the present invention is not limited solely to the above-presented embodiments but it can be modified within the scope of the appended claims.

The invention claimed is:

1. A method of processing a file selected for deletion, the method comprising:
   dividing a file selected for deletion into a plurality of parts;
   evaluating a cost function wherein the cost function comprises a first cost associated with storing a first part of the plurality of parts at a first device, a second cost associated with storing a second part of the plurality of parts at a second device, and a third cost associated with transferring the second part to the second device;
   storing an identifier at the first device, the identifier identifying a storage location of the file;
   transferring at least a part of the plurality of parts to the second device based on the cost function evaluation; and
   storing at least one of a name of the file selected for deletion, a time of deletion of the file selected for deletion, and an identifier of the second device at the first device.

2. The method of claim 1, wherein evaluating the cost function comprises minimizing the cost function based on a length of the plurality of parts relative to a memory capacity of the first device and of the second device.

3. The method of claim 1, wherein transferring at least the part of the plurality of parts to the second device comprises transmitting at least the part of the plurality of parts to the second device using a wireless transmission system.

4. The method of claim 1, further comprising:
   before transferring at least the part of the plurality of parts to the second device, sending a notice to a user that a memory of the first device does not have sufficient memory available to store the file selected for deletion;
   receiving a decision from the user to the sent notice at the first device; and
   if the received decision indicates that initiation of the transfer is acceptable to the user, transferring at least the part of the plurality of parts to the second device.

5. The method of claim 1, further comprising:
   receiving a request to restore the file selected for deletion at the first device;
   contacting the second device from the first device for information related to at least the transferred part of the plurality of parts; and
   receiving at least the transferred part of the plurality of parts at the first device from the second device.

6. The method of claim 1, further comprising:
   before transferring at least the part of the plurality of parts to the second device, transmitting an inquiry message to the second device;
   receiving a response to the inquiry message from the second device at the first device; and
   if the received response indicates that the transfer is acceptable to the second device, transferring at least the part of the plurality of parts to the second device.

7. The method of claim 1, wherein the first device is a mobile terminal.

8. The method of claim 1, further comprising:
   after transferring at least the part of the plurality of parts to the second device, receiving an acknowledgement message at the first device from the second device; and
   if the received acknowledgement message indicates that the transfer to the second device was unsuccessful, repeating the transfer of at least the part of the plurality of parts to the second device.

9. The method of claim 1, further comprising:
   before dividing the file, determining if a wastebasket memory is approximately full at the first device;
   if the wastebasket memory is approximately full, determining if the file is a complete file stored in the wastebasket memory; and
   if the file is a complete file stored in the wastebasket memory, dividing the file.

10. A device comprising:
    a communication interface, the communication interface configured to send at least a part of a file selected for deletion to a second device;
    a memory having computer-readable instructions stored therein which are programmed to
      divide the file into a plurality of parts;
      evaluate a cost function wherein the cost function comprises a first cost associated with storing a first part of the plurality of parts in the memory, a second cost associated with storing a second part of the plurality of parts at the second device, and a third cost associated with transferring the second part to the second device;
      store an identifier at the device, the identifier identifying a storage location of the file;
      transfer at least a part of the plurality of parts to the second device based on the cost function evaluation; and
      store at least one of a name of the file selected for deletion, a time of deletion of the file selected for deletion, and an identifier of the second device at the device; and
    a processor, the processor coupled to the communication interface and to the memory and configured to execute the computer-readable instructions.

11. The device of claim 10, wherein evaluating the cost function comprises minimizing the cost function based on a length of the plurality of parts relative to a memory capacity of the device and of the second device.

12. The device of claim 10, wherein the computer-readable instructions programmed to transfer at least the part of the plurality of parts to the second device comprise transmitting at least the part of the plurality of parts to the second device using a wireless transmission system.

13. The device of claim 10, wherein the computer-readable instructions are further programmed to:
before transferring at least the part of the plurality of parts to the second device, send a notice to a user that the memory does not have sufficient memory available to store the file selected for deletion;
receive a decision from the user to the sent notice; and
if the received decision indicates that initiation of the transfer is acceptable to the user, transfer at least the part of the plurality of parts to the second device.

14. The device of claim 10, wherein the computer-readable instructions are further programmed to:
receive a request to restore the file selected for deletion;
contact the second device for information related to at least the transferred part of the plurality of parts; and
receive at least the transferred part of the plurality of parts from the second device.

15. The device of claim 10, wherein the computer-readable instructions are further programmed to:
before transferring at least the part of the plurality of parts to the second device, transmit an inquiry message to the second device;
receive a response to the inquiry message from the second device; and
if the received response indicates that the transfer is acceptable to the second device, transfer at least the part of the plurality of parts to the second device.

16. The device of claim 10, wherein the device is a mobile terminal.

17. The device of claim 10 wherein the computer-readable instructions are further programmed to:
after transferring at least the part of the plurality of parts to the second device, receive an acknowledgement message from the second device; and
if the received acknowledgement message indicates that the transfer to the second device was unsuccessful, repeat the transfer of at least the part of the plurality of parts to the second device.

18. The device of claim 10, wherein the computer-readable instructions are further programmed to:
before dividing the file, determine if a wastebasket memory is approximately full;
if the wastebasket memory is approximately full, determine if the file is a complete file stored in the wastebasket memory; and
if the file is a complete file stored in the wastebasket memory, divide the file.

19. A memory including computer-readable instructions stored therein that, upon execution by a processor, cause the processor to process a file selected for deletion, the computer-readable instructions configured to cause a first device to:
divide a file selected for deletion into a plurality of parts;
evaluate a cost function wherein the cost function comprises a first cost associated with storing a first part of the plurality of parts in the memory, a second cost associated with storing a second part of the plurality of parts at a second device, and a third cost associated with transferring the second part to the second device;
store an identifier at the first device, the identifier identifying a storage location of the file;
transfer at least a part of the plurality of parts to the second device based on the cost function evaluation; and
store at least one of a name of the file selected for deletion, a time of deletion of the file selected for deletion, and an identifier of the second device at the first device.

20. The memory of claim 19, wherein evaluating the cost function comprises minimizing the cost function based on a length of the plurality of parts relative to a memory capacity of the first device and of the second device.

21. The memory of claim 19, wherein the computer-readable instructions configured to cause the first device to transfer at least the part of the plurality of parts to the second device comprise transmitting at least the part of the plurality of parts to the second device using a wireless transmission system.

22. The memory of claim 19, wherein the computer-readable instructions are further configured to cause the first device to:
before transferring at least the part of the plurality of parts to the second device, send a notice to a user that the memory does not have sufficient memory available to store the file selected for deletion;
receive a decision from the user to the sent notice; and
if the received decision indicates that initiation of the transfer is acceptable to the user, transfer at least the part of the plurality of parts to the second device.

23. The memory of claim 19, wherein the computer-readable instructions are further configured to cause the first device to:
receive a request to restore the file selected for deletion;
contact the second device for information related to at least the transferred part of the plurality of parts; and
receive at least the transferred part of the plurality of parts from the second device.

24. The memory of claim 19, wherein the computer-readable instructions are further configured to cause the first device to:
before transferring at least the part of the plurality of parts to the second device, transmit an inquiry message to the second device;
receive a response to the inquiry message from the second device; and
if the received response indicates that the transfer is acceptable to the second device, transfer at least the part of the plurality of parts to the second device.

25. The memory of claim 19, wherein the first device is a mobile terminal.

26. The memory of claim 19, wherein the computer-readable instructions are further configured to cause the first device to:
after transferring at least the part of the plurality of parts to the second device, receive an acknowledgement message from the second device; and
if the received acknowledgement message indicates that the transfer to the second device was unsuccessful, repeat the transfer of at least the part of the plurality of parts to the second device.

27. The memory of claim 19, wherein the computer-readable instructions are further configured to cause the first device to:
after transferring at least the part of the plurality of parts to the second device, receive an acknowledgement message from the second device; and if the received acknowledgement message indicates that the transfer to the second device was unsuccessful, remove the file selected for deletion from the memory.

28. The memory of claim 19, wherein the computer-readable instructions are further configured to cause the first device to:

before dividing the file, determine if a wastebasket memory is approximately full;

if the wastebasket memory is approximately full, determine if the file is a complete file stored in the wastebasket memory; and if the file is a complete file stored in the wastebasket memory, divide the file.

* * * * *